United States Patent
Kocher

(10) Patent No.: US 7,821,384 B2
(45) Date of Patent: Oct. 26, 2010

(54) DEVICE FOR FATIGUE WARNING IN MOTOR VEHICLES HAVING A RUN-UP ALARM SYSTEM

(75) Inventor: Pascal Kocher, Gerlingen (DE)

(73) Assignee: Robert Bosch GmbH, Stuttgart (DE)

(*) Notice: Subject to any disclaimer, the term of this patent is extended or adjusted under 35 U.S.C. 154(b) by 546 days.

(21) Appl. No.: 10/574,208

(22) PCT Filed: Jul. 22, 2004

(86) PCT No.: PCT/DE2004/001630
§ 371 (c)(1),
(2), (4) Date: May 8, 2008

(87) PCT Pub. No.: WO2005/044612
PCT Pub. Date: May 19, 2005

(65) Prior Publication Data
US 2009/0219161 A1    Sep. 3, 2009

(30) Foreign Application Priority Data
Oct. 28, 2003   (DE) ................. 103 50 276

(51) Int. Cl.
*B60Q 1/00* (2006.01)

(52) U.S. Cl. .............. 340/435; 340/576; 340/903

(58) Field of Classification Search ........... 340/435, 340/436, 438, 903, 904, 933, 575, 576; 701/301, 701/213; 180/169
See application file for complete search history.

(56) References Cited

U.S. PATENT DOCUMENTS 5,357,438 A * 10/1994 Davidian ............... 340/436

FOREIGN PATENT DOCUMENTS

| DE | 43 38 244 | 5/1994 |
|---|---|---|
| DE | 100 24 227 | 12/2001 |
| DE | 101 35 742 | 2/2003 |
| DE | 101 63 967 | 7/2003 |
| EP | 0 901 055 | 3/1999 |
| FR | 2 784 887 | 4/2000 |
| JP | 2000036098 | 2/2000 |
| JP | 2002029282 | 1/2002 |
| WO | WO 95/14939 | 6/1995 |
| WO | WO 00/24309 | 5/2000 |

* cited by examiner

*Primary Examiner*—Van T. Trieu
(74) *Attorney, Agent, or Firm*—Kenyon & Kenyon LLP

(57) ABSTRACT

A device for fatigue warning in motor vehicles includes a driver sensor system for detecting driver fatigue conditions and a run-up alarm system which has an environment sensor system. The alarm system is designed to output a warning signal and/or perform a control action in the drive and/or brake system of the vehicle when the distance to a preceding vehicle drops below a warning distance. The run-up alarm system has a setting device which is configured to modify the warning distance as a function of the detected fatigue condition.

10 Claims, 1 Drawing Sheet

DEVICE FOR FATIGUE WARNING IN MOTOR VEHICLES HAVING A RUN-UP ALARM SYSTEM

FIELD OF THE INVENTION

The present invention relates to a fatigue warning device in motor vehicles, having a driver sensor system for detecting driver fatigue conditions and having a run-up alarm system which has an environment sensor system, which warning device is designed to output a warning signal and/or perform a regulating intervention in the drive and/or brake system of the vehicle when the distance to a preceding vehicle drops below a warning distance.

BACKGROUND INFORMATION

A fatigue warning device has been previously proposed by the present inventor, in which the fatigue warning system is combined with an ACC (adaptive cruise control) system. ACC systems are already in practical use and typically include as an environment sensor system a radar sensor installed in the front of the vehicle, which locates preceding vehicles, and a controller which automatically intervenes in the drive or brake system of the vehicle if the distance to the preceding vehicle drops below a predefined setpoint distance. If the distance to the preceding vehicle increases again, the controller causes the vehicle to accelerate, so that the distance is automatically regulated to the setpoint distance. The setpoint distance is usually defined by what is known as time gap, i.e., the time interval between the preceding vehicle and the host vehicle passing a fixed point on the roadway.

In some systems of this type, the driver has the option of setting the setpoint time gap within certain limits, for example, between one and two seconds.

In addition to ACC systems in which automatic distance regulation is performed, run-up alarm systems are also known in which only a warning signal is output if the time gap drops below a setpoint value, referred to as a warning distance, while the driver is left to control the vehicle. In the present specification, the term "warning distance" is used instead of the term "setpoint distance" even if actually not only a warning, but also an intervention in the drive or brake system, occurs.

In the device previously proposed by the present inventor, if the driver sensor system detects a driver fatigue condition, the vehicle is forcibly decelerated and finally braked to a standstill. The risk of an accident is thus minimized by the combination with the distance regulating system. If the roadway in front of the host vehicle is free, the vehicle decelerates with a moderate deceleration rate so as not to irritate or put at risk the traffic following behind. In contrast, if a preceding vehicle is detected by the environment sensor system, the host vehicle is decelerated more severely and more rapidly as a function of the measured distance, so as to prevent a collision with the rear of the preceding vehicle. The setpoint time gap set, however, is independent of the driver's fatigue condition.

Published international patent document WO 00/24309 describes a fatigue warning system in which a driving impairment is detected using a camera system which monitors the driver's eyelid movements. If driving impairment is detected, this warning system is designed not only to output a warning signal and turn on the hazard warning lights, but also to initiate controlled braking to safely brake the vehicle to a standstill.

In most known fatigue warning systems, only a warning signal is output to the driver when a fatigue condition is detected, for example, an optical or acoustic warning signal or also a haptic signal, for example, in the form of vibration of the steering wheel. However, these systems are not easily accepted by drivers, because the driver feels bothered by frequent warning signals most of which are subjectively perceived as unjustified.

SUMMARY

The present invention provides the advantage that the acceptance of the fatigue warning system by the driver is increased and yet a high degree of traffic safety is achieved.

For this purpose, according to the present invention, the warning distance on which the run-up alarm system or distance regulating system is based is modified as a function of the fatigue condition detected. If driver fatigue is detected, initially no warning signal is output; only the warning distance is increased. The warning signal is not output until the distance to the preceding vehicle drops below the now increased warning distance. In this way, increased traffic safety is achieved without bothering the driver with unnecessary signals, by increasing the response time available to the driver when tailgating the preceding vehicle. Instead of, or in addition to, outputting a warning signal, the vehicle may also be automatically decelerated by the distance regulating system. This deceleration of the vehicle occurring at an unusually great distance is usually noticed by the driver and therefore also has the function of a "gentle" warning signal which is therefore more acceptable to the driver.

The warning distance may be defined by a setpoint time gap, as used in distance regulating systems or ACC systems. In systems where the driver is allowed to set the setpoint time gap manually, the device according to the present invention is designed in such a way that the automatic increase in the setpoint time gap overrides the driver's manual setting. The setting range provided for manual setting may also be exceeded upward if fatigue is detected.

It is advantageous to display the fatigue condition detected using an optical display on the dashboard in such a way that the response of the run-up alarm system or distance regulating system which is unusual for the driver is made transparent.

DETAILED DESCRIPTION

Figure 1:
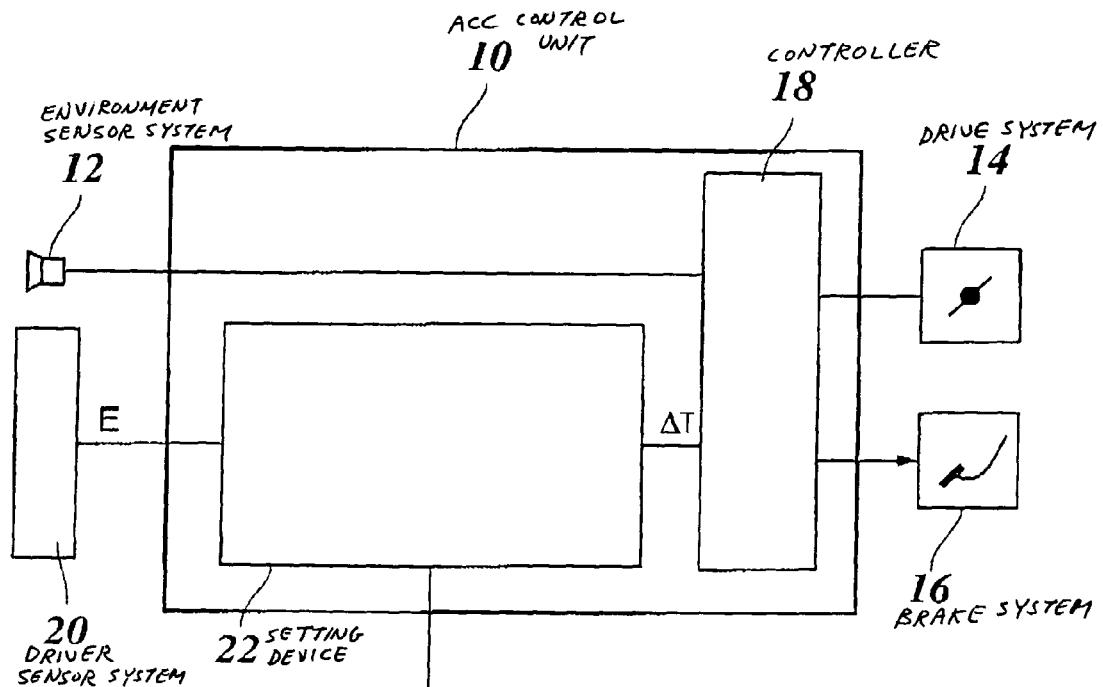
FIG. 1 shows a block diagram of an example embodiment of the device according to the present invention.

FIG. 1 shows, as a block diagram, an ACC control unit of a motor vehicle formed by one or more microprocessors, which receives signals from an environment sensor system 12, for example, a radar sensor installed in the front of the vehicle and, on the basis of the measured distance and the relative velocity of a preceding vehicle, intervenes in drive system 14 and/or brake system 16 of the vehicle to regulate the distance to the preceding vehicle to a setpoint distance (warning distance) defined by a setpoint time gap. These regulating functions are performed by a controller 18 of ACC control unit 10.

In addition, the device according to the present invention has a driver sensor system 20, which is able to detect the driver's fatigue condition. This driver sensor system 20 may be formed, for example, by a camera system and an electronic image analyzing system which responds to the driver's eyelid movements. Optionally or additionally, other criteria may also be used for recognizing fatigue conditions, such as, for example, the frequency of relatively abrupt steering interventions by the fatigued driver for keeping the vehicle in its lane. If environment sensor system 12 also includes a camera system directed to the roadway for recognizing the roadway boundaries, the frequency and degree of deviations from the center of the lane may also be considered for fatigue detection.

Driver sensor system 20 is designed in such a way that it statistically analyzes the frequency of signs of driver fatigue and computes a quantitative parameter E (degree of fatigue) from this statistical data.

ACC control unit 10 furthermore contains a setting device 22, which determines a setpoint time gap $\Delta T$ which is then used as a basis for the distance regulating function or distance warning function in controller 18. An operator's control 24 connected to setting device 22 allows the driver to set time gap $\Delta T$ to be used within a limited setting range of one or two seconds, for example, under normal conditions, when no fatigue exists.

Degree of fatigue E is transmitted by driver sensor system 20 to setting device 22 and is used there for modifying setpoint time gap $\Delta T$ as a function of the fatigue condition.

Figure 2:
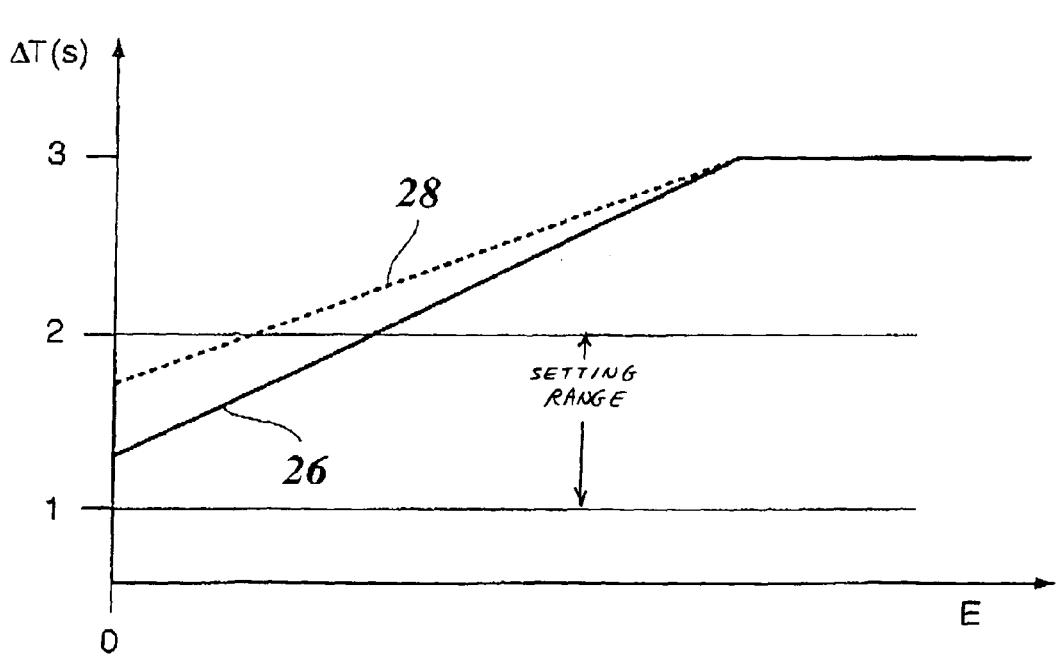
FIG. 2 shows a graph illustrating the modification of a setpoint time gap as a function of the fatigue condition.

An example of the modification of the setpoint time gap performed automatically in setting device 22 is graphically illustrated in FIG. 2. For a degree of fatigue E=0, the setting manually made by the driver using operator's control 24 applies. Setpoint time gap $\Delta T$ thus set is within the setting range of one to two seconds. With increasing degree of fatigue, setpoint time gap $\Delta T$ increases linearly as shown by solid curve 26 in FIG. 2. As fatigue increases, this modified setpoint time gap may also exceed the upper limit of the setting range of two seconds. Finally at a certain degree of fatigue, the setpoint time gap reaches a maximum value, which in the example shown is 3 seconds, and it then remains constant even at a higher degree of fatigue.

This automatic increase in the setpoint time gap as a function of degree of fatigue E makes it possible to increase the warning distance or, in the case of an active distance regulating function, the setpoint distance at which a preceding vehicle is followed as the degree of fatigue increases, so that the response time which becomes potentially longer in the event of driver fatigue is taken into account.

If the driver has set or sets a longer setpoint time gap within the setting range of one to two seconds, the setpoint time gap is modified as shown by curve 28 which is drawn as a dashed line in FIG. 2. Also in this case, the setpoint time gap is increased linearly to a maximum value and then remains constant. Even if the driver attempts to re-adjust the setpoint time gap using operator's control 24 and sets it to the maximum possible value of two seconds, for example, in the event of a higher degree of fatigue a forced increase in the setpoint time gap takes place, which the driver is unable to change. Increased traffic safety is thus achieved, while the driver is discreetly prompted to take a rest.

Normally, the driver is able to deactivate the ACC function at any time by inputting an appropriate command. The device described herein may, however, also be designed in such a way that the ACC function is forcibly activated and cannot then be deactivated by the driver if degree of fatigue E exceeds a certain threshold value.

What is claimed is:

1. A device for providing a fatigue warning to a driver in a controlled motor vehicle traveling on a roadway, comprising:
   a driver sensor system for detecting a driver fatigue condition; and
   an alarm system including an environment sensor system and a setting device, wherein the alarm system is configured to one of output a warning signal and perform a control action when a distance between the controlled motor vehicle and a preceding vehicle drops below a warning distance, the control action including controlling at least one of a drive system and a brake system of the controlled motor vehicle, the warning distance being defined initially by a setpoint time gap, and wherein the setting device of the alarm system configured to modify the warning distance as a function of the detected driver fatigue condition.

2. The device as recited in claim 1, wherein the setpoint time gap represents a time interval between the preceding vehicle and the controlled motor vehicle passing the same point on the roadway.

3. The device as recited in claim 2, further comprising:
   an operator's control element assigned to the setting device, the operator's control element enabling the driver to manually set one of the warning distance and the setpoint time gap;
   wherein the setting device is configured to override the one of the warning distance and the setpoint time gap manually set by the driver, depending on the detected driver fatigue condition.

4. The device as recited in claim 3, wherein one of the warning distance and the setpoint time gap may be manually set with the aid of the operator's control element only within predefined limits, and wherein the setting device is configured to increase one of the warning distance and the setpoint time gap beyond the predefined limits if a driver fatigue condition is detected.

5. The device as recited in claim 2, wherein the driver sensor system is configured to output a parameter that quantitatively defines the driver fatigue condition, and wherein the setting device is configured to increase one of the warning distance and the setpoint time gap according to a monotonically increasing function of the parameter.

6. The device as recited in claim 5, wherein the alarm system is configured to be activated automatically when a driver fatigue condition is detected.

7. The device as recited in claim 1, further comprising:
   an operator's control element assigned to the setting device, the operator's control element enabling the driver to manually set one of the warning distance and the setpoint time gap;
   wherein the setting device is configured to override the one of the warning distance and the setpoint time gap manually set by the driver, depending on the detected driver fatigue condition.

8. The device as recited in claim 7, wherein one of the warning distance and the setpoint time gap may be manually set with the aid of the operator's control element only within predefined limits, and wherein the setting device is configured to increase one of the warning distance and the setpoint time gap beyond the predefined limits if a driver fatigue condition is detected.

9. The device as recited in claim 7, wherein the driver sensor system is configured to output a parameter that quantitatively defines the driver fatigue condition, and wherein the setting device is configured to increase one of the warning distance and the setpoint time gap according to a monotonically increasing function of the parameter.

10. The device as recited in claim 9, wherein the alarm system is configured to be activated automatically when a driver fatigue condition is detected.

* * * * *